United States Patent [19]
Daman

[11] Patent Number: 5,469,699
[45] Date of Patent: Nov. 28, 1995

[54] METHOD AND APPARATUS FOR GENERATING ELECTRICAL ENERGY UTILIZING A BOILER AND A GAS TURBINE POWERED BY A CARBONIZER

[75] Inventor: Ernest L. Daman, Mountainside, N.J.

[73] Assignee: Foster Wheeler Development Corporation, Livingston, N.J.

[21] Appl. No.: 320,881

[22] Filed: Oct. 14, 1994

[51] Int. Cl.⁶ ................................................ F02C 3/28
[52] U.S. Cl. .................................... 60/39.02; 60/39.12
[58] Field of Search ............................ 60/39.02, 39.12, 60/39.182, 39.464; 110/230; 201/17

[56] References Cited

U.S. PATENT DOCUMENTS

| | | |
|---|---|---|
| 3,086,362 | 4/1963 | Foster-Pegg ........................... 60/39.12 |
| 3,446,014 | 5/1969 | Foster-Pegg ........................... 60/39.182 |
| 3,481,834 | 12/1969 | Squires ................................. 60/39.182 |
| 3,979,188 | 9/1976 | McCallister . |
| 4,219,537 | 8/1980 | Steiner . |
| 4,609,541 | 9/1986 | Calderon . |
| 5,063,732 | 11/1991 | Calderon . |
| 5,161,367 | 11/1992 | Scalzo .................................... 60/39.12 |
| 5,255,506 | 10/1993 | Wilkes et al. . |
| 5,255,507 | 10/1993 | Gounder ................................ 60/39.12 |

Primary Examiner—Louis J. Casaregola
Attorney, Agent, or Firm—Marvin A. Naigur

[57] ABSTRACT

An apparatus and method for generating electrical energy utilizing a boiler and a gas turbine powered by a carbonizer. A carbonizer is provided which produces low-Btu gases which are passed to a gas turbine for driving the turbine, and a char which is passed to a boiler for powering the boiler. The turbine utilizes the low-Btu gases as its sole source of power and is operated independently of the boiler.

12 Claims, 1 Drawing Sheet

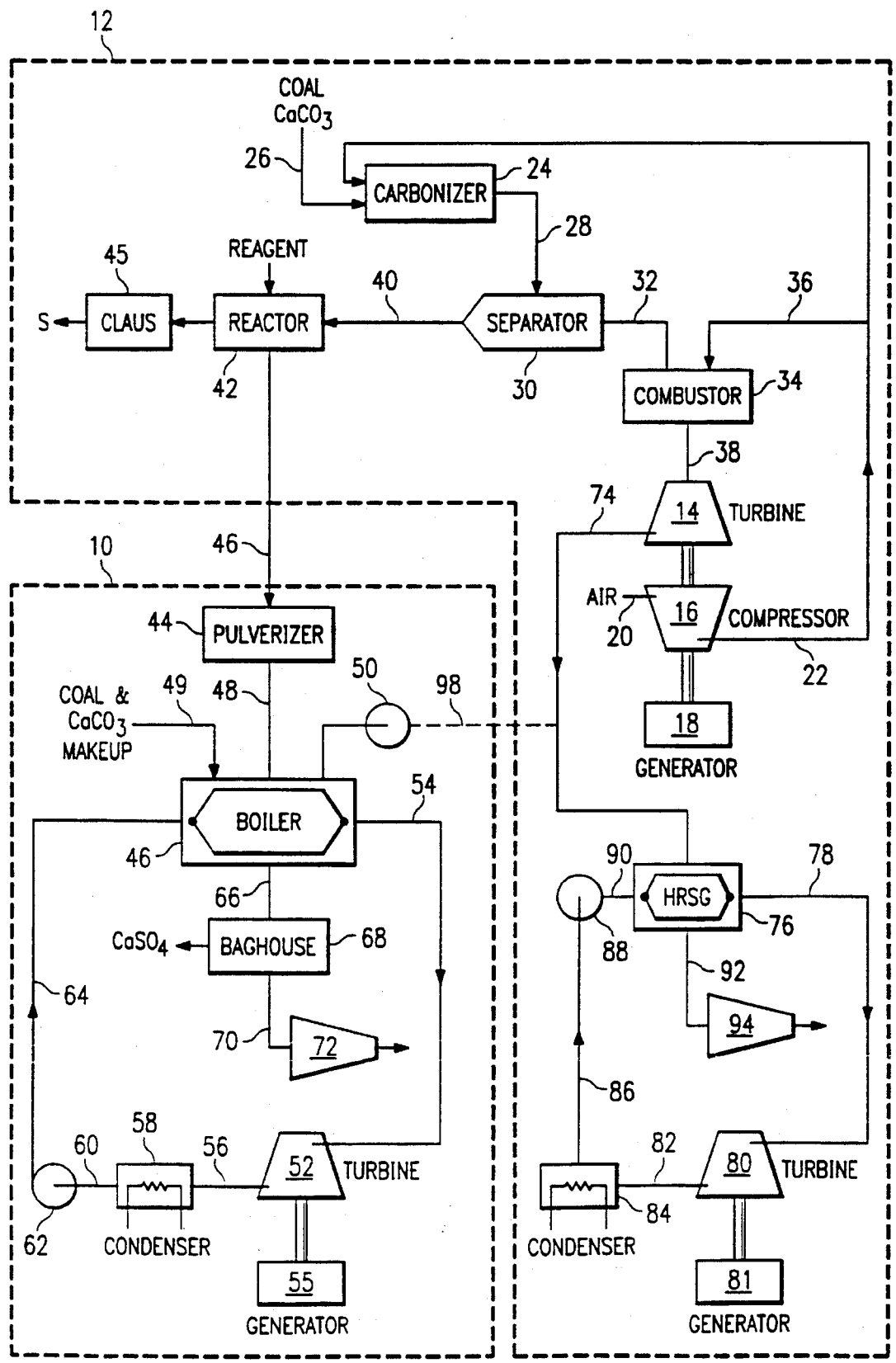

METHOD AND APPARATUS FOR GENERATING ELECTRICAL ENERGY UTILIZING A BOILER AND A GAS TURBINE POWERED BY A CARBONIZER

BACKGROUND OF THE INVENTION

This invention relates to an apparatus and method for repowering a coal-fired steam generator, and, more particularly, to such an apparatus and method in which the combustion or boiler is repowered by incorporating a partial gasifier or carbonizer that produces a low-Btu fuel gas to power a gas turbine and a partially desulfurized char to be fired in the boiler.

Although coal fired boilers have enjoyed considerable success in supplying heat energy to steam turbines in utility plants for producing electrical energy, it has always been difficult to keep them in compliance with federal and state emissions standards. This is especially true with respect to the introduction of sulfur products into the air, especially when certain coals having high sulfur contents are used.

Since gas turbines are fairly efficient even when driven by a relatively low-Btu gas, they also lend themselves to the production of electrical energy. In these arrangements the coal is initially introduced to a partial gasifier or carbonizer which produces a relatively low-Btu gas which is passed to the gas turbine and a char which is passed elsewhere in the plant. However, one disadvantage of carbonizers is that, with some coals, only a fraction of the thermal energy in the coal can be extracted in the form of gas, while the remaining percentage leaves the carbonizer in the form of char.

The present invention is a result of the recognition that the char obtained from the carbonizer under the above-described conditions can, when properly treated, be utilized to drive the above-described boilers in a manner to considerably reduce the production of sulfur emissions. Most importantly, this invention allows repowering of an existing steam generator, increasing the total plant output of electric energy while raising the plant efficiency and reducing sulfur emissions to the atmosphere.

SUMMARY OF THE INVENTION

It is therefore an object of the present invention to provide an apparatus and method which incorporates a carbonizer to provide a low-Btu gas which is used to power a gas turbine and a partially desulfurized char which is fired in a boiler.

It is further a further object to provide a method and apparatus of the above type in which the gas turbine is decoupled from the boiler and utilizes the low-Btu gas from the carbonizer as its only source of fuel.

It is further object of the present invention to provide an apparatus and method of the above type in which the char passing from the carbonizer to the boiler is treated in a manner so that the levels of sulfur released into the atmosphere by the boiler are relatively low.

It is a further object of the present invention to provide an apparatus and method of the above type in which a relatively high efficiency is obtained.

Toward the fulfillment of these and other objects, according to the apparatus and method of the present invention a carbonizer is utilized for the generation of low-Btu gas and solid char. The low-Btu gases are passed to a combustion chamber where they are mixed with compressed air to raise the temperature of the gases before they are passed to a gas turbine for driving same. The char is passed to a boiler which operates to produce hot gases that are passed in a heat exchange relation with water to produce steam. The gas turbine utilizes the low-Btu gases as its sole source of power and is operated independently of the boiler.

BRIEF DESCRIPTION OF THE DRAWINGS

The above brief description, as well as further objects, features, and advantages of the present invention will be more fully appreciated by reference to the following detailed description of the presently preferred but nonetheless illustrative embodiment in accordance with the present invention when taken in conjunction with the drawing which is a schematic diagram of the system of the present invention.

DESCRIPTION OF THE PREFERRED EMBODIMENT

In the drawing the reference numerals 10 and 12 refer, in general, to a boiler system and a carbonizer system, respectively. The carbonizer system 12 is comprised of a gas turbine 14 that is drivingly connected to an air compressor 16 and to an electrical generator 18 to drive same in a conventional manner. The air compressor 16 receives ambient air from an inlet conduit 20 and operates to compress the air which is passed through a conduit 22 extending from the outlet of the air compressor 16 to a carbonizer 24.

A feeder 26 introduces particulate fuel, such as coal, into the carbonizer 24, it being understood that other feeders can be associated with the carbonizer 24 for distributing limestone, or other particulate adsorbent material into the carbonizer 24, as needed. The carbonizer 24 functions in a conventional manner to partially gasify the fuel material and convert it into fuel gas and a char and to enable the limestone to absorb the sulfur generated in the gasification process.

A conduit 28 registers with an outlet formed in the carbonizer 24 to communicate it with a cyclone separator 30 disposed adjacent the carbonizer 24. The separator 30 thus receives the low-Btu gas generated in the carbonizer and entrained solids, namely, the solid char and reacted limestone from the carbonizer 24 and operates in a conventional manner to disengage the solids from the low-Btu gas due to the centrifugal forces created in the separator 30. As cyclone separators are well known in the art, the separator 30 will not be described in any further detail.

The separated low-Btu gases, which are substantially free of char enter a conduit 32 projecting upwardly through the upper portion of the separator 30 for passage into a topping combustor 34. A conduit 36 connects the conduit 22 to the topping combustor 34 which operates in a conventional manner to combust the low-Btu gases in the presence of the compressed air received from the conduit 22. The gas outlet of the combustor 34 is connected, by a conduit 38, to the inlet of the gas turbine 14 for passing the heated gases to the turbine to drive the turbine.

The separated solids, including the char and the reacted limestone, drain by gravity from the separator 30 into a conduit 40 which extends into a reactor 42 disposed adjacent the separator 30. In the reactor, the solids are mixed with a reagent which is introduced into the reactor 42 for the purpose of removing sulfur from the reacted limestone by chemical extraction. A conduit 46 connects the combustion system 10 to the carbonizer system 12 and, more particularly, the reactor 42 to a pulverizer (if required) 44 to pass the treated char and treated limestone to the pulverizer. The removed sulfur, which is in the form of $H_2S$, is passed to a claus unit 45, or equivalent, which converts the $H_2S$ into elemental sulfur.

A conduit 48 extends from the pulverizer 44 and registers with an opening formed in a boiler 46, to pass the treated char, which has a significant Btu content, to the boiler 46. A conduit 49 extends into the boiler 46 for introducing a makeup fuel, such as coal, into the boiler, along with an adsorbent, such as raw limestone ($CaCO_3$), for adsorbing sulfur products by the combustion of the fuel. Ambient air is introduced into the boiler 46 via a fan 50, or the like, to support the burning, or combustion, of the mixture of char and coal, reacted limestone, and makeup limestone, if required. The boiler 46 includes a water/steam flow circuit which passes the water/steam in an absorbing relation with the heat generated in the boiler as a result of the above combustion. This circuit includes a steam turbine 52 which receives steam from the boiler via a conduit 54 and which drives an electrical generator 55 in a conventional manner. A conduit 56 passes the exhaust steam from the turbine 52 to a condenser 58 and the water from the condenser is returned to the boiler 46 via a conduit 60, a pump 62, and a conduit 64, respectively. Since these type of boilers are well known in the industry, the boiler 46 will not be described in further detail.

The exhaust gases from the boiler 46 pass, via a conduit 66, to a baghouse 68 which operates to separate any solids such as coal, ashes, or the like, from the gases before the gases are passed, via a conduit 70, to a stack 72 for exhaustion to the atmosphere.

The hot exhaust gases from the outlet of the turbine 14 are passed, by a conduit 74, to a heat recovery steam generator 76. The heat recovery steam generator 76 transfers heat from these gases to water flowing through the generator 76 in a conventional manner to produce steam. A conduit 78 passes the steam generated in the generator 76, to a steam turbine 80 which operates in a conventional manner to drive a generator 81. The outlet of the steam turbine 80 is connected, by a conduit 82, to a condenser 84, where the steam is converted to water. The converted water is then passed to the heat recovery steam generator 76, via a conduit 86, a pump 88, and a conduit 90. The remaining exhaust gases from the turbine 80 and the heat recovery steam generator 76 are vented from the system via a conduit 92 and a stack 94.

In operation, ambient air is introduced into the air compressor 16 which is driven by the gas turbine 14 to compress the air in order to raise its pressure. A portion of the compressed air is passed from the compressor 16 to the combustor 34 while the remaining air is passed to the carbonizer 24.

In the carbonizer 24, the particulate fuel is carbonized to produce low-Btu fuel gases and char, while the limestone reacts with the sulfur generated during the process and adsorbs the sulfur. The low-Btu gases and the entrained solids from the carbonizer 24 are passed to the separator 30 which operates in a conventional manner to separate the solids from the gases, with the solids being introduced to the reactor 42 and the gases to the combustor 34.

In the combustor 34, the gases are mixed with a portion of the air from the compressor 16 and combusted to raise the temperature of the low-Btu gas to the temperature required for maximum efficiency of the turbine 14. The gases are then introduced to the gas turbine 14 to drive same with an increased mass and volume to enable the gas turbine 14 to drive the air compressor 16 and the electrical generator 18.

The exhaust gases from the gas turbine 14 are directed to the generator 76. In the generator 76, the heat from the exhaust gases is transferred to water in the manner described above thereby producing steam which drives the steam turbine 80, which, in turn, drives the generator 81, all in a conventional manner. The cooled exhaust gases from the heat recovery steam generator, are vented from the system via the stack 94.

Sulfur is removed from the separated limestone in the reactor 42 by the reagent before the mixture of char and limestone is pulverized in the pulverizer 44 and introduced into the boiler 46 where it is mixed with ambient air, along with makeup coal and limestone from the feeder 49, as needed. The char is combusted in the boiler 46 in a conventional manner to heat the water/steam mixture circulating through the boiler. The steam is passed to the turbine 52 for driving the turbine which, in turn, drives the electrical generator 55. The exhaust steam from the turbine 52 is passed in a heat exchange relationship with water in the condenser 58 and converted to water before it is passed back to the boiler 46. The exhaust gases from the boiler 46 are passed through the baghouse 68 which operates to separate any solids from the gases before the latter are passed to the stack 72.

The system and method of the present invention thus have several advantages over the prior art. By adding the carbonizer/gas turbine system to the boiler, the char from the carbonizer (along with some makeup coal and raw limestone, as needed) can be used to power the boiler, while a relatively large amount of sulfur can be captured by the limestone in the carbonizer 24 and removed at the reactor 42, thus considerably reducing the sulfur emissions by the boiler. Also, the low-Btu gas from the carbonizer is the sole source of fuel for the turbine 14 and thus allows the turbine, and its associated combustor, to be decoupled from the boiler, and operate independently.

In addition, the exhaust gases from the turbine 14 can be supplied to the heat recovery steam generator 76 for the production of steam to drive the steam turbine 80 resulting in the recovery of the thermal energy stored in the exhaust gases, thereby efficiently using the exhaust from the gas turbine by not venting the exhaust to the atmosphere.

Although not specifically illustrated in the drawing, it is understood that additional necessary equipment will be provided, and that these and all components described above are arranged in an appropriate fashion to form a complete and operative system.

It is understood that variations may be made in the method of the present invention without departing from the scope of the invention. For example, the heat recovery system generator 76 could be eliminated, and a conduit 98 provided to pass the gases discharged from the gas turbine 14 to the boiler 46. Since the latter gases are relatively high in oxygen content, they could be used in place of the ambient air normally supplied to the boiler 46 by the fan 50. Additionally, a heat exchanger may be added between the carbonizer 24 and the separator 30 to cool the gas-solids stream, thereby allowing the condensation of alkalis. Furthermore, a barrier filter may be added downstream of the separator 30 to remove fine particulates that escape the separator. Also, a scrubber can be disposed between the baghouse 68 and the stack 72 for removing sulfur products from the gases before they are exhausted to the atmosphere.

It should be noted that the amount of char produced in the carbonizer 24 will depend on the size or rating of the gas turbine which uses the fuel gas from the carbonizer as its sole source of fuel. Therefore, in some cases the char produced may only represent a small portion of the total fuel input to the existing boiler. In other cases it may represent a larger percentage of the total fuel to the boiler.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. Apparatus for generating energy, said apparatus comprising:

means for carbonizing fuel in the presence of limestone to generate fuel gas and char including limestone containing sulfur generated during said carbonizing, a separator for receiving said fuel gas and char from said carbonizing means and for separating said char from said fuel gas, a gas turbine, means for passing said fuel gas to said gas turbine for driving same, means operatively connected to said gas turbine for generating electrical energy;

a reactor, means for passing said char to said reactor for removing said sulfur from said limestone, a boiler, means for passing said char from said reactor to said boiler for powering said boiler, and, means operatively connected to said boiler for generating electrical energy.

2. The apparatus of claim 1 further comprising means for passing the exhaust gases from said turbine to said boiler.

3. The apparatus of claim 1 further comprising a steam generator and means for passing the exhaust gases from said turbine to said steam generator to generate steam.

4. The apparatus of claim 2 further comprising means for receiving the steam from said steam generator and generating additional electrical energy.

5. The apparatus of claim 1 further comprising a combustor for receiving said fuel gas from said separator and combusting said fuel gas to increase the temperature of said fuel gas before said fuel gas is passed to said gas turbine.

6. The apparatus of claim 5 further comprising an air compressor for receiving and compressing ambient air, means for passing a portion of said compressed air from said compressor to said carbonizing means to support the generation of said fuel gas, and means for passing another portion of said compressed air to said combustor so that said fuel gas is combusted in the presence of said air.

7. A method of generating energy comprising the steps of carbonizing fuel in the presence of limestone to generate fuel gas and char including limestone containing sulfur generated during said carbonizing, separating said char from said fuel gas, passing said fuel gas to a gas turbine for driving same and generating electrical energy;

passing said char to a reactor for removing said sulfur from said limestone, and passing said char from said reactor to a boiler for powering said boiler and generating additional electrical energy.

8. The method of claim 7 further comprising the step of passing the exhaust gases from said turbine to said boiler.

9. The method of claim 7 further comprising the step of passing the exhaust gases from said turbine to a steam generator to generate steam.

10. The method of claim 9 further comprising the step of utilizing said steam to generate additional electrical energy.

11. The method of claim 7 further comprising the step of combusting said fuel gas to increase the temperature of said fuel gas before said fuel gas is passed to said gas turbine.

12. The method of claim 11 further comprising the steps of compressing ambient air, utilizing a portion of said compressed air in said step of carbonizing, and utilizing another portion of said compressed air in said step of combusting.

* * * * *